United States Patent
Morard et al.

(10) Patent No.: US 8,434,122 B2
(45) Date of Patent: Apr. 30, 2013

(54) DEVICE FOR BROADCASTING AUDIO AND VIDEO DATA

(75) Inventors: Jean-Pierre Morard, Neuilly sur Seine (FR); Jean-Marc Nogier, Le Mesnil le Roi (FR)

(73) Assignee: Sagem Communications SAS, Paris (FR)

( * ) Notice: Subject to any disclaimer, the term of this patent is extended or adjusted under 35 U.S.C. 154(b) by 775 days.

(21) Appl. No.: 12/530,891

(22) PCT Filed: Mar. 11, 2008

(86) PCT No.: PCT/FR2008/050407
§ 371 (c)(1),
(2), (4) Date: Dec. 15, 2009

(87) PCT Pub. No.: WO2008/129192
PCT Pub. Date: Oct. 30, 2008

(65) Prior Publication Data
US 2010/0107207 A1    Apr. 29, 2010

(30) Foreign Application Priority Data
Mar. 13, 2007 (FR) ...................... 07 53796

(51) Int. Cl.
*H04N 7/173* (2011.01)
(52) U.S. Cl.
USPC ........... 725/110; 725/114; 725/127; 348/790; 348/E3.016; 375/240.01; 375/E7.026
(58) Field of Classification Search .................. 725/114, 725/127; 375/240.01, E07.02; 348/790, 348/E3.016
See application file for complete search history.

(56) References Cited

U.S. PATENT DOCUMENTS

| | | | | |
|---|---|---|---|---|
| 6,064,422 A * | 5/2000 | Goolcharan et al. | ........ | 348/14.12 |
| 7,114,174 B1 * | 9/2006 | Brooks et al. | .................. | 725/105 |
| 7,158,683 B2 * | 1/2007 | Yokose | ......................... | 382/245 |
| 2004/0255326 A1 * | 12/2004 | Hicks et al. | ...................... | 725/81 |
| 2005/0219202 A1 * | 10/2005 | Bishnoi et al. | ................ | 345/156 |
| 2006/0271976 A1 * | 11/2006 | Yurt et al. | ........................ | 725/87 |
| 2008/0201751 A1 * | 8/2008 | Ahmed et al. | ................. | 725/109 |
| 2009/0228946 A1 * | 9/2009 | Perlman et al. | ................ | 725/110 |
| 2009/0232326 A1 * | 9/2009 | Gordon et al. | ................... | 381/81 |
| 2010/0226422 A1 * | 9/2010 | Taubin et al. | .................. | 375/231 |

FOREIGN PATENT DOCUMENTS

| | | |
|---|---|---|
| DE | 1440926 A1 | 1/1969 |
| EP | 1617664 A1 | 1/2006 |
| FR | 2806572 A1 | 9/2001 |
| FR | 2888424 A1 | 1/2007 |
| GB | 2059669 A | 4/1981 |
| WO | WO-99/09787 A1 | 2/1999 |
| WO | WO-01/08167 A1 | 2/2001 |

* cited by examiner

*Primary Examiner* — Nasser Goodarzi
*Assistant Examiner* — Paul Graham
(74) *Attorney, Agent, or Firm* — Im IP Law PLLC; C. Andrew Im

(57) ABSTRACT

The invention relates to a device for delivering audio and video data. In such a device, the audio/video data travel together and are compressed along with the signaling data for the delivery of these audio/video data. Under current compression standards, these data are being increasingly compressed. This maximum compression proportionally complexifies the encoding and decoding of audio/video data. The appearance of network cables comprising six twisted pairs of wires makes it possible to produce networks having higher speed capacities. The object of the invention is not to increase speeds by using additional twisted pairs but to simplify the data traveling through the network.

9 Claims, 1 Drawing Sheet

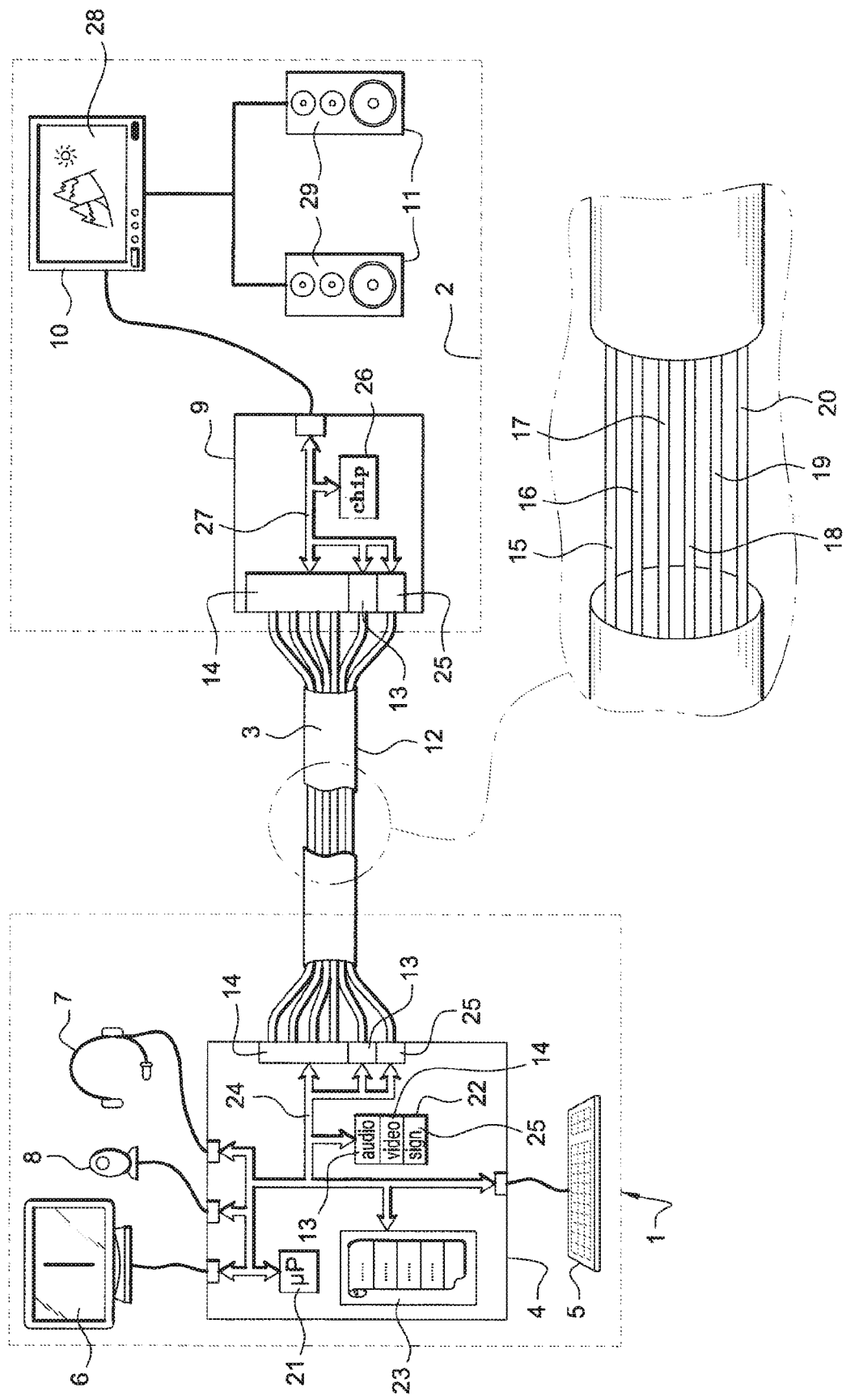

DEVICE FOR BROADCASTING AUDIO AND VIDEO DATA

RELATED APPLICATIONS

This application is a §371 application from PCT/FR2008/050407 filed Mar. 11, 2008 which claims priority from French Patent Application No. 07 53796 filed Mar. 13, 2007, each of which is herein incorporated by reference in its entirety.

TECHNICAL FIELD OF THE INVENTION

The present invention relates to a device for delivering audio and video data. The currently most widespread type of cabled computer network uses twisted pair cabling. There are generally two types of twisted pairs, shielded pairs and unshielded pairs. In its simplest form, twisted pair cable is composed of two copper strands twisted together and covered with insulating materials. The twisting makes it possible to suppress interference. However, a twisted pair cable is generally made from several twisted pairs grouped together and placed in a protective sheath.

BACKGROUND OF THE INVENTION

Twisted pair cables allow data to be transferred over a segment with a maximum length of about 100 meters. However, these cables do not always make it possible to guarantee the integrity of data over long distances at high speeds.

Twisted pair cables are rated by category, which means that there are several categories of cable having different transfer characteristics. Cables in Category 1 are traditional telephone cables. Such Category 1 cables allow voice transfer but not data transfer. Cables in Categories 2 through 5e are cables that allow data transfer. These cables are composed of four twisted copper pairs. Category 2 cables allow a maximum speed of 4 Mbps. Category 3 cables allow a maximum speed of 10 Mbps. Category 4 cables allow a maximum speed of 16 Mpbs. Category 5 cables allow a maximum speed of 100 Mbps, and Category 5e cables allow a maximum speed of 1 Gbps. This type of cabling can, for example, be connected to an RJ45-type connector.

Transferring audio and video data between a server, typically a computer, and a client, typically a decoder which can be incorporated into a battery powered LCD panel, in this type of network generally requires the audio and video data to be encoded. This is done using space-time encoding. Space-time encoding fully encodes only part of the images to be transmitted in order to reconstruct a video. Thus, for example, only one image in five may be fully encoded. The images that are not fully encoded are directly referred, for the non-encoded parts, to the identical parts encoded by the previously fully encoded images. Thus, a non-fully encoded image includes only the parts of the image that have changed from the previous images and the addresses of the parts of the image that are unchanged from the previously encoded images. Furthermore, certain types of encoding compress the audio and video data, along with the signaling data that allow these data to be delivered correctly, into a single block.

This compression makes it possible to save on bandwidth use during the transfer. For cables like those described above, this bandwidth savings is not insignificant. The decoding is done by the client. Once this decoding is done, the audio and video are delivered by the client via its own delivery means, for example a battery powered LCD panel comprising a screen and speakers in addition to the decoder.

Thus, one of the standards used today is, for example, H264—more particularly, "H264 transport stream," also referred to below as H264 TS. H264 TS includes both audio data and video data. In addition, H264 TS includes the signaling data that allow the audio and video data to be synchronized.

However, in order to economize on bandwidth, the data must be compressed as much as possible. This substantial compression makes both encoding and decoding highly complex. In essence, the server must not only perform an image compression but must also perform numerous calculations for determining the addresses and the data to be encoded. Likewise, the client decodes these audio and video data as a result of numerous calculations. For a client like a simple decoder, this complexity makes the decoding chips very complex to produce, given that the decoder performs the decoding at the hardware level. Furthermore, this complexity substantially increases the power consumption of such a device due to the number of calculations that must be performed for the encoding and decoding. This excess power consumption makes it problematic to use certain devices, such as a battery powered LCD panel, in which the power reserves are limited.

OBJECT AND SUMMARY OF THE INVENTION

New technologies developed for network cabling enable a much higher speed than that enabled by Category 5e cabling, for example. Thus, a new type of cabling, Category 7, allows a speed of 10 Gbps over a distance of 100 m. For example, a new type of connector has recently appeared, the GG45 (registered trademark). A connector of this type with Category 7 cabling allows retransmissions at a frequency of up to 600 MHz.

Category 7 cabling of this type includes six twisted pairs where the RJ45 has only four. In this Category 7 cabling, the six pairs are used to enable a high speed up to a great distance. However, the presence of cables with six twisted pairs does not alter the complexity of the encoding and decoding of the data. Thus, the client that decodes the data is still just as complex to produce and still consumes just as much power. The current trend, since the beginning of the digital era, is to compress the data to be transferred as much as possible in order to save on bandwidth use to the maximum extent possible.

In order to produce a decoding chip that is simple and consumes less power, the invention provides for using the bandwidth capacities offered by Category 7 network cabling. More particularly, the invention provides for reducing the complexity of the encoding and decoding of audio and video data in order to lessen the tasks of the server and the client while using the new network cable capacities to retain a suitable transfer rate. This reduction in the complexity of the encoding and decoding makes it possible to construct a simple decoding chip. Moreover, the simplicity of the calculations to be performed in order to decode the audio and video data makes it possible to reduce the power consumption and the time used by the decoding chip to perform these calculations. To reduce the complexity of the encoding and decoding of the data, the invention provides for using simple codecs that encode the video data only spatially. Spatial-only encoding is an encoding in which all of the images constituting a video are fully encoded, meaning that there is no image that refers to another image in order to be displayed. Examples of such codecs are JPEG 2000, PNG, MJPEG or ZIP.

Using such codecs, while they are simple to implement, uses a lot of bandwidth. Category 7 cables, however, offer enough bandwidth to allow the invention to use these codecs under good conditions. Another advantage of Category 7 cabling is that it allows each of the twisted pairs of the network cable to support an application without any impact on the other twisted pairs of the same cable.

The invention provides for the video data to travel through the network using four twisted pairs of a six-twisted-pair Category 7 cable. Secondly, the invention provides for the audio data to travel through a twisted pair that is not used for the transfer of video data. Thirdly, the invention provides for the signaling data, particularly for the synchronization of the audio data and video data, to travel through the last twisted pair, i.e. the twisted pair not used for the transfer of audio data or video data. This way of using network cabling makes it possible, thanks to the use of a Category 7 cable comprising six twisted pairs, to retain a suitable transfer rate. Moreover, the invention makes it possible to simplify the encoding and decoding solutions. The hardware elements, such as the decoding chips, are also simplified. Finally, simplifying the calculations performed for the encoding and decoding enables substantial energy and time savings, which is not insignificant when using a device that runs on a power cell or batteries, such as LCD panels.

According to the invention, the audio, video and signaling data are separated prior to the encoding of the audio data and video data.

Thus, the subject of the invention is a device for delivering audio and video data comprising a server and a client,
- a network cable through which audio and video data flow between the server and the client,
- the network cable comprising six twisted pairs of wires, characterized in that
- the video data travel through the network cable between the server and the client by passing through only four twisted pairs,
- the audio data travel through the network cable between the server and the client by passing through a single unused twisted pair,
- signaling data which synchronize the audio data and video data travel through the network cable between the server and the client by passing through a single remaining twisted pair of wires.

BRIEF DESCRIPTION OF THE DRAWINGS

The invention will be more clearly understood by reading the following description and examining the accompanying figures. These are given only as an example and do not in any way limit the invention. The figures show:

FIG. 1: A diagram of the device for delivering audio and video data according to the invention.

DETAILED DESCRIPTION OF THE EMBODIMENTS

FIG. 1 represents a diagram of the device for delivering audio and video data according to the invention. Such a device according to the invention comprises a server 1, for example a computer 1, a client 2, for example an LCD panel 2, and network cable 3. The computer 1 comprises a central processor 4, a keyboard 5, a monitor 6, as well as a microphone 7 and a digital camera 8. The LCD panel 2 comprises a decoder 9, a screen 10 and speakers 11. The network cable 3 comprises a Category 7 cable 12 for the transfer of audio data 13 and video data 14 between the server 1 and the client 2. Such a Category 7 cable comprises six twisted pairs of wires, respectively the pairs 15, 16, 17, 18, 19 and 20. Such cabling can be, for example, GG45 (registered trademark) cabling.

In such a device, the audio data 13 are captured via the microphone 7. The video data 14 are captured via the camera 8. The central processor 4 comprises a microprocessor 21, a data memory 22, a program memory 23 and a set of internal buses 24. The microprocessor 21 performs the calculations related to the current applications in the server 1. The data memory 22 stores data such as the audio data 13 or video data 14. The program memory 23 stores the programs to be applied in the server 1. Finally the internal buses 24 make it possible to interconnect all of the internal elements of the central processor. In addition, the internal buses enable the connection between the internal elements of the central processor and the external elements.

The audio data 13 and video data 14 respectively captured by the microphone 7 and the camera 8 are stored in the data memory 22. These data are processed by the microprocessor 21 in order to construct an audio/video sequence. This audio/video sequence is produced using the instructions given by the program memory 23. Typically, this audio/video sequence is edited using a codec defined in the program memory 23. The codec also makes it possible to edit signaling data 25. These signaling data 25 make it possible to deliver the audio/video sequence; in particular, these signaling data 25 enable synchronized delivery of the audio data 13 and the video data 14.

The audio/video sequence edited by the server 1 is sent by the server 1 to the client 2 via the network 3. The client decodes the data of the audio/video sequence received and then delivers them normally.

The client 2 comprises a decoding chip 26, internal buses 27, a video delivery means 28, typically a screen 28, and an audio delivery means, typically speakers 29. The internal buses 27 enable the connection between the various elements of the client 2. These internal buses 27 also enable the connection between the client 2 and the network 3.

Category 7 network cabling 3 enables a high speed over a long distance. A speed of 10 gigabytes over a distance of 100 meters can be achieved without difficulty, and the speed capacities can be increased even further. Currently, six twisted pairs 15 through 20 are used to transmit the encoded audio data 13 and video data 14 together. Thus, for example with "H264 transport stream," the audio data 13, video data 14 and signaling data 25 are encoded together, i.e. in a single block, by the server 1. These audio 13, video 14 and signaling 25 data are compressed in a complex way in order to economize as much as possible on the bandwidth used to transfer them. In fact, all of the technologies developed to date have a tendency to compress the data that travel through a network 3 as much as possible. This desired maximum compression makes the encoding and decoding of the audio data 13 and video data 14 increasingly complex. This complexity of the data imposes a complex operation on the server 1. Likewise, the client 2 that must decode these data is complex to produce.

The constant improvement in the speeds possible with the existing network 3 currently makes it possible to retain a high speed while simplifying the encoding and decoding of the audio data 13 and video data 14. Simplifying the encoding and decoding of these audio/video data would make it possible to simplify the client 2 that must decode these data, and to lessen the encoding task of the server 1.

The invention therefore allows the use of more bandwidth than the current encoding devices, as well as a use of the twisted pairs of a six-twisted-pair network 3 cable 12 that is different from the conventional use.

The invention provides for transmitting these data through specific twisted pairs. Thus, the device according to the invention encodes the video data 14 using a simple spatial codec.

Such a codec encodes all of the images constituting an audio/video sequence, unlike a codec that does space-time encoding, such as for example H264.

The video data 14 therefore travel, according to the invention, using only four twisted pairs. The twisted pairs used to transmit the video data 14 can be, for example, the pairs 15, 16, 17 and 18. The audio data 13 travel through a single twisted pair. The twisted pair through which the audio data travel 13 is a pair that is not used to transmit either the video data 14 or the signaling data 25. This twisted pair used to transmit the audio data 13 can be, for example, the twisted pair 19. The signaling data 25 also travel through a single twisted pair. This twisted pair, being the last twisted pair available, i.e. the pair through which neither the audio data nor the audio data travel, can be for example the twisted pair 20. The transmission of these data through independent twisted pairs is made possible by the use of Category 7 network cable.

The video data 14 according to the invention can therefore be encoded using a simple spatial codec such as JPEG 2000, MJPEG, zip or any other simple spatial codec. A simple codec of this type encodes the video data 14 in such a way that the transmission of these video data 14 through the network 3 uses more bandwidth than these same video data 14 would use with a space-time codec. However, such a simple codec significantly lightens the encoding and decoding load of the server 1 and the client 2. In addition, such simple encoding reduces the power consumption of the client 2 and the server 1 as a result of the lower number of calculations they have to perform.

According to the invention, the signaling data 25, the audio data 13 and the video data 14 are separated prior to the encoding of the video data 14 by the microprocessor 21. This makes it possible to differentiate these data and to transmit them through the network separately.

The device according to the invention is not limited to Category 7 cable, but to any type comprising six twisted pairs of wires that makes it possible to transmit with enough speed to transfer audio/video data. Such a cable makes it possible to transmit separate audio/video data using distinct twisted pairs for the audio data 13, the video data 14 and the synchronization data 25.

Since using a device according to the invention reduces power consumption, the invention is particularly well adapted to any device having a limited usage time for power consumption reasons. These devices may be, for example, LCD panels, portable telephones, or any other type of device that enables audio data 13 and video data 14 to be transferred through a cabled network.

The audio data 13 can travel through the network 3 directly in an analog format or can be encoded by the server 1. The advantage of analog format audio is that the client 2 has a lower processing load for these audio data 13. However, the server 1 can encode these audio data 13, for example in a 64 Kb format.

The invention claimed is:

1. A device for delivering audio and video data, comprising
a server comprising a processor for processing video, audio and signaling data, and encoding the video data only spatially using a codec;
a client device;
a network cable comprising six twisted pairs of wires for transmitting the audio and video data between the server and the client device;
wherein the video data travel between the server and the client device over only four twisted pairs of wires of the network cable;
wherein the audio data travel between the server and the client device over one of the two unused twisted pairs of wires of the network cable; and
wherein the signaling data which synchronize the audio data and video data travel between the server and the client device over the remaining unused twisted pair of wires of the network cable.

2. The device of claim 1, wherein the processor of the server separates the audio data, the video data and the signaling data prior to encoding of the video data.

3. The device of claim 1, wherein the network cable is a Category 7 network cable.

4. The device of claim 1, wherein the network cable transmits the video, audio and signaling data independently over a distinct twisted pair of wires.

5. The device of claim 1, wherein the processor encodes the video data in JPEG 2000.

6. The device of claim 1, wherein the client device comprises a liquid crystal display (LCD) video panel.

7. The device of claim 1, wherein the processor transmits the audio data in analog format to the client device over the network cable.

8. The device of claim 1, wherein the processor compresses the audio data and transmits compressed audio data to the client device over the network cable.

9. The device of claim 1, wherein the server further comprises a memory to store the video, audio and signaling data.

* * * * *